May 10, 1966     J. C. GEIST ETAL     3,250,653

METHOD OF MAKING A GEAR TYPE TOOTHED BELT

Filed April 30, 1964     2 Sheets-Sheet 1

*INVENTORS*
JOSEPH C. GEIST
JOHN J. YOUNG
HAROLD E. COLLINS

BY *J B Holden*
ATTORNEY

May 10, 1966 J. C. GEIST ETAL 3,250,653
METHOD OF MAKING A GEAR TYPE TOOTHED BELT
Filed April 30, 1964 2 Sheets-Sheet 2
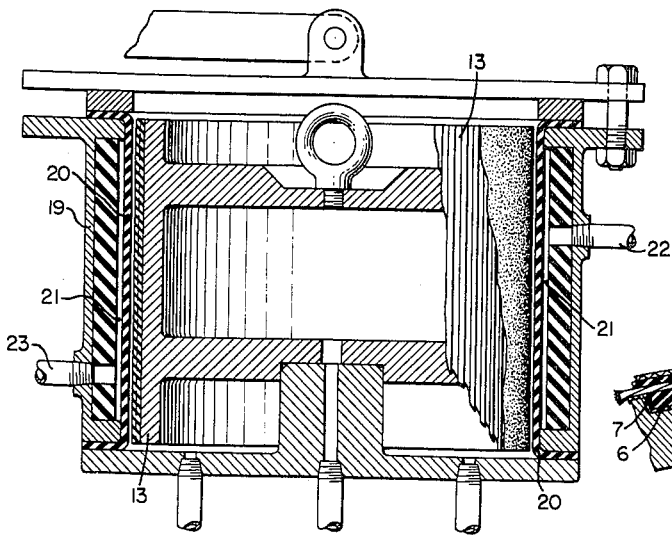
FIG. 10
FIG. 8
FIG. 12
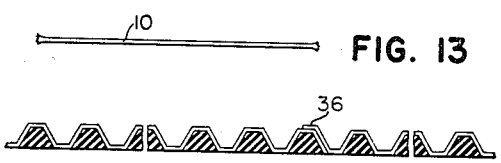
FIG. 13
FIG. 17
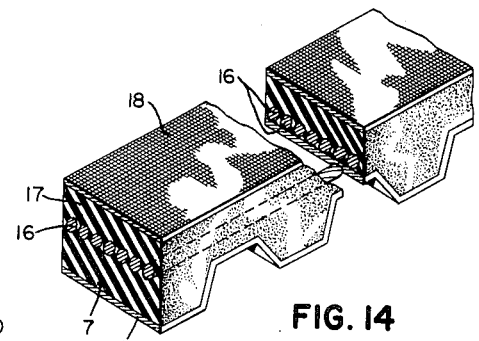
FIG. 14
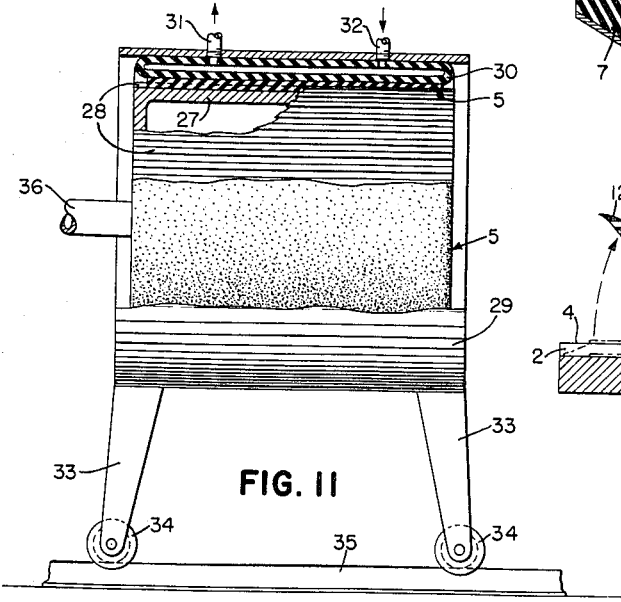
FIG. 11
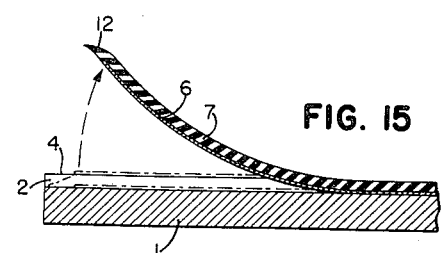
FIG. 15
INVENTORS
JOSEPH C. GEIST
JOHN J. YOUNG
HAROLD E. COLLINS
BY
J B Holden
ATTORNEY

United States Patent Office 3,250,653
Patented May 10, 1966

3,250,653
METHOD OF MAKING A GEAR TYPE TOOTHED BELT
Joseph C. Geist and John J. Young, Lincoln, Nebr., and Harold E. Collins, St. Petersburg, Fla., assignors to The Goodyear Tire & Rubber Company, Akron, Ohio, a corporation of Ohio
Filed Apr. 30, 1964, Ser. No. 363,752
10 Claims. (Cl. 156—138)

The present invention relates to a toothed belt and to the method and apparatus for making such a belt. The invention relates particularly to forming gear type teeth on belts designed to mesh with similar teeth on spaced pulleys so as to drive one pulley by the other in predetermined timed relation thereto. Such belts must have accurately formed teeth, and in most instances it is desirable to provide the teeth with a protective fabric covering to reduce wear on the teeth and to prevent the teeth from chipping or breaking away from the body of the belt.

This application is a continuation in part of application Serial No. 723,554, filed March 24, 1958, now abandoned.

The principal object of this invention is to provide a method and apparatus for forming the toothed sections of such belts to reduce the time and expense involved in their manufacture as will be more clearly pointed out in the detailed description.

A further object of this invention is to provide an improved method for assembling and curing such belts.

A still further object of this invention is to use a highly stretchable fabric as a covering for the teeth of a belt, the stretchability being primarily in the direction of the length of the belt. This property of the fabric is used to simplify the method of manufacturing the belt and to provide, at the same time, a protective and strengthening layer for the teeth.

In the drawings:

FIG. 8 shows the application of the cover stock;

FIG. 10 shows one method of curing the belts after they are formed on the mandrel;

FIG. 11 shows an alternate method to that shown in FIGS. 1 to 5 inclusive for initially forming the toothed section;

FIGS. 12 and 13 illustrate, respectively, the filler and warp cords of the fabric shown in FIG. 2;

FIG. 14 is a fragmentary isometric view partly in section illustrating the construction of the completed belt;

FIG. 15 illustrates the preferred manner of stripping the pre-formed toothed section from the matrix;

Figure 1:
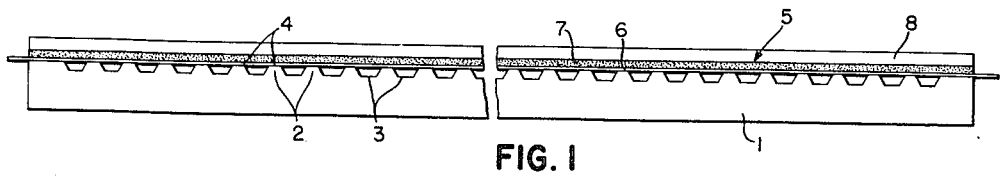
FIG. 1 is an elevational view showing a preliminary step in the manufacture of the toothed section of the belt.

Referring particularly to FIGS. 1–5 inclusive, a forming board or matrix 1 is provided, in its upper surface, with a plurality of belt tooth forming grooves 3. The lands 4 on the ridges 2 between the grooves 3 lie in the upper surface of the matrix. These grooves are open at the ends, as seen in FIGS. 1 and 15. A composite or laminated deformable sheet 5 is composed of a fabric layer 6 and a layer of an unvulcanized deformable elastomeric material 7 such as rubber. The fabric layer 6 is preferably impregnated with an elastomeric compound compatible with the layer of elastomeric material 7. The fabric layer 6 has a permissible stretch in a direction transversely to the grooves 3, so that when pressure is brought to bear on the laminated sheet 5 to cause the rubber to flow into the grooves 3, the force created by the rubber against the fabric will stretch the fabric and force it firmly against the walls of the grooves.

The laminated sheet 5, in one form of the invention, has the fabric layer 6 impregnated with neoprene cement and the layer 7 formed of unvulcanized neoprene rubber. The layers 6 and 7 may be united prior to applying the laminated sheet 5 to the matrix or the two layers 6 and 7 of the laminated sheet may be placed one on top of the other as in FIG. 1 without initially bonding them to each other before pressure is applied. A flat sheet 8 of relatively stiff unyielding material is then laid on the upper surface of the laminated sheet 5. At least the under surface of sheet 8, which engages the laminated sheet 5, should be such that it will not adhere thereto. One material that has been found satisfactory for this purpose is a compound known as Teflon, manufactured by the E. I. du Pont de Nemours & Co., and is a polymerized tetrafluoroethylene. This may comprise the entire sheet 8, since it is a hard surfaced material, or it may be applied as a layer to a supporting sheet. The terms "Teflon board" or "Teflon sheet" as used herein mean a sheet in which the belt material contacting surface is formed of Teflon. In lieu of using a sheet of material that will not stick to the laminated sheet, a suitable lubricant may be employed between the sheet 8 and the laminated sheet 5. The main purpose of using either method is to permit easy separation of the sheet 8 from the composite sheet 5 after the teeth have been formed.

Figures 2, 4:
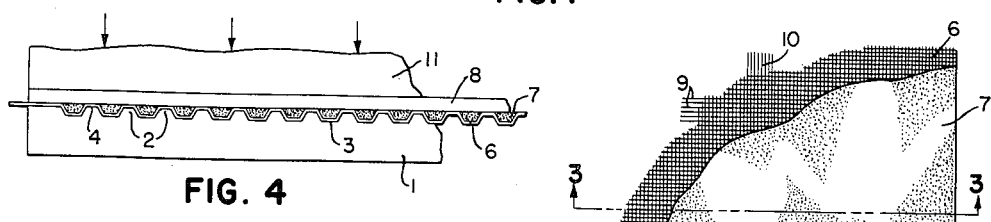
FIG. 2 is a fragmentary view of the fabric used for covering the teeth.
FIG. 4 is a fragmentary elevational view showing the preliminary step of forming the toothed section.

The neoprene impregnated fabric layer 6 is shown diagrammatically in plan view in FIG. 2 and comprises closely arranged filler cords 9 and warp cords 10. The filler cords 9 are illustrated more particularly in FIG. 12 and the warp cords in FIG. 13. The filler cords are shown as being crimped in FIG. 12 so as to be extensible but these may also be coiled, whereas the warp cords in FIG. 13 are straight and preferably substantially inextensible. As one example, the filler cord 9 may be any of the well-known nylon cords which have been given an initial high twist and then untwisted after heat treatment, but other materials may be used. The untwisted cord thereafter retains a substantial amount of the twist initially given to it so that later when an endwise pull is exerted on the cord it will stretch readily. The principal aim is to provide a cord which has sufficient stretch to permit the fabric to line the grooves in the matrix without causing the ends of the material being pulled in at the ends to any substantial extent when a pressure is applied to the laminated sheet to force the fabric layer into conformity with the walls of the grooves and distinguishes from bias-cut fabric having substantially inextensible cords which permit pantographing of the cords to provide some elongation but with a reduction in width of the fabric in so doing. The term "high stretch" as used in the claims in reference to the cords in the fabric layer as well as to the fabric layer itself, means material or cords having such properties. While each of the warp cords 10 shown in FIG. 13 may also be stretchable, it is preferred that they be substantially unstretchable for a purpose which will appear later in the description. The cords 9 and 10 are woven together to form the fabric layer 6 and then the fabric layer is preferably impregnated with an unvulcanized neoprene rubber.

Before the laminated sheet is placed on the upper surface of the matrix 1 it is preferable to clean the matrix and spray the upper surface and grooves with silicone or some similar lubricant. Then, after spraying, the matrix is wiped lightly to remove excess silicone from the matrix. The silicone is used primarily to clean the matrix and to prevent the toothed section adhering to the matrix after it is formed.

Figures 3, 5:
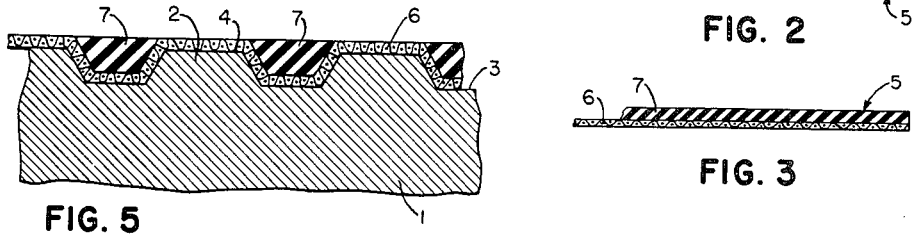
FIG. 3 is a cross-section taken along the line 3—3 of FIG. 2.
FIG. 5 is an enlarged fragmentary cross-sectional view similar to FIG. 4.

The laminated sheet 5 is laid on the upper surface of the matrix 1 with the fabric layer 6 in contact with the lands 4 and with the filler cords 9 extending in a direction transversely of the grooves 3, or from left to right in FIGS. 1, 4 and 5. The laminated sheet is then placed under a pressure exerted in a direction to move the fabric and the neoprene layers into the grooves 3 as shown in FIG. 4. To get this pressure, any well-known type of platen press may be employed. The upper platen 11 of such a press is shown in FIG. 4. A lower platen (not shown) supports the matrix 1. This platen 11 is heated in any well-known manner and before pressure is exerted on the laminated sheet the sheet is preferably first warmed by contact with the heated platen 11 or in some other manner, to cause the neoprene layer 7 and the neoprene in the fabric layer 6 to soften to some extent to provide a better flow of rubber into the grooves. The heating should not be sufficient to cause any appreciable vulcanization of the neoprene itself. This operation will be referred to as a warm-up operation. The pressure will unite the laminated layers 6 and 7, if not previously united.

Thereafter the full pressure of the platen is applied to the laminated sheet 5 and the material in the fabric and neoprene layers are moved into the grooves 3 as shown in FIG. 4, this pressure being applied preferably until the Teflon sheet engages the fabric overlying the lands 4 of the teeth so that there is no appreciable amount of neoprene overlying the fabric above the lands. The neoprene and fabric layers in the original laminated sheet 5 are forced into the grooves 3 to fill the grooves, as clearly shown in FIG. 5. Preferably a small excess of neoprene is employed in the layer 7 so that the belt teeth will be fully formed and any excess neoprene may flow endwise out of the open ends of the grooves which are generally quite long, sometimes as much as 30″. This excess neoprene is trimmed off later. The laminated strip thus formed will be referred to as the "toothed section" and at this stage it is still in an unvulcanized state. By the time the toothed section is formed, practically all of the lengthwise stretch is taken out of the cords 9. It is important to have sufficient stretch in the fabric to cause the complete lining of the grooves without shifting of the fabric where is engages the lands 4.

In order to strip the toothed section from the mold it is preferable to lift the lateral edge of the section from the matrix 1 as illustrated in FIG. 15 so that any pull exerted on the toothed section in removing it from the matrix will not distort the toothed section as the resultant force is lengthwise of the inextensible warp cords 10. Thus, after being stripped from the matrix the toothed section itself will not be distorted. The toothed section may be removed by lifting the end of same as at the right in FIG. 1, but in doing so there is a great possibility that, if care is not used, the toothed section may be distorted as the neoprene is not yet vulcanized.

Figures 6, 7:
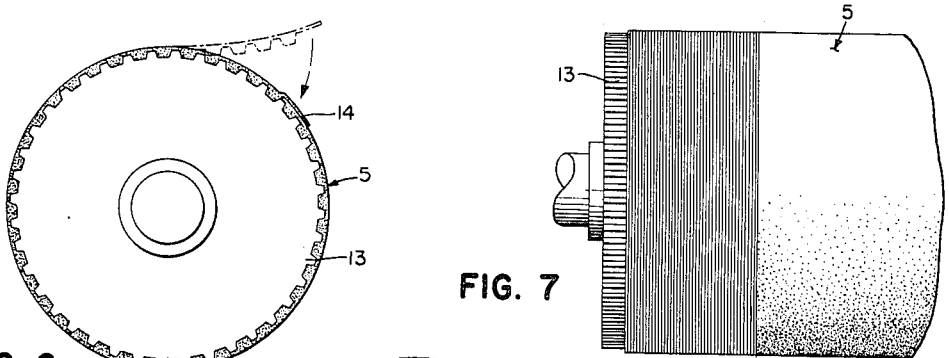
FIG. 6 is an end view of a generally cylindrical aluminum mandrel or matrix with the preformed toothed section of FIG. 4 applied thereto.
FIG. 7 shows the manner of applying the cord tension layer.

The excess neoprene 12 (FIG. 15) at the ends of the teeth of the toothed section may then be cut off to provide a square edge. This toothed section is then laid around a second matrix or mandrel 13 which also serves as a curing mandrel as shown in FIG. 6. The mandrel 13 is formed at the surface thereof with axially extending grooves having the configuration desired for the teeth in the completed belt. For convenience here and in the claims, 13 will be referred to as a "mandrel." This configuration should be such that the toothed section shown in FIGS. 4 and 5 will fit the grooves in the mandrel 13 and the ends of the toothed section may then be lap spliced after the toothed section is wrapped about the mandrel as shown in FIG. 6 at 14. This splice could be made as a butt splice but this might tend to weaken the structure at the splice because the cords in the fabric layer 6 would not overlap. This may not be vital in belts where no substantial strain is to be placed on the fabric layer because the load is actually taken by the cords in the strain resisting layer 16 which are applied in a manner to be described later.

Figures 9, 16:
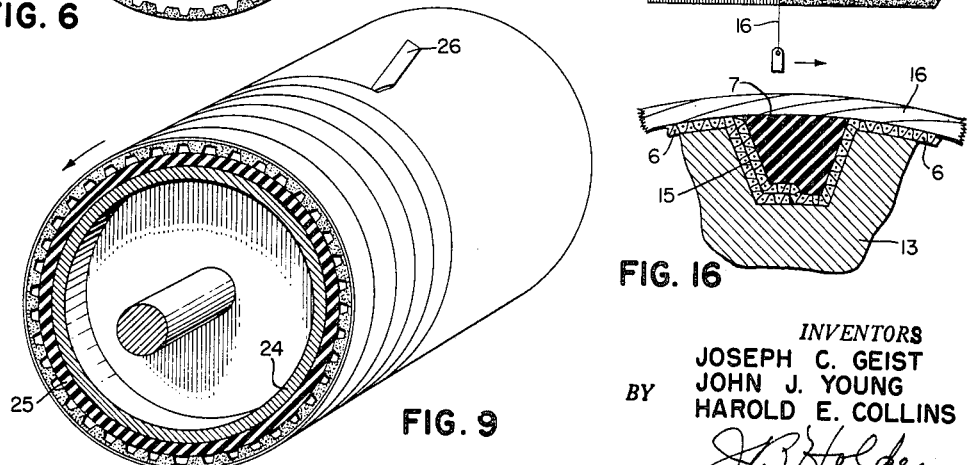
FIG. 9 shows the manner of cutting the belts after they have been formed.
FIG. 16 is in a fragmentary showing an alternate method of splicing the ends of the toothed section; and, FIG. 17 illustrates the manner of joining toothed sections for longer belts.

Another method that may be employed is to have the lap splice over the teeth of the toothed section as illustrated at 15 in FIG. 16, the fabric being first trimmed at the ends of the toothed section to proper length before splicing. In trimming the toothed section, one end is trimmed adjacent the base of a tooth so that a tooth is trimmed adjacent the base of a tooth so that a tooth is at the extreme end of the section. The other end is trimmed outwardly of the last tooth to be left at that end to leave an extending layer of fabric. Then this extending layer of fabric is lapped over the surface of the last tooth at the first end of the section. As will be seen from an inspection of FIG. 16, such a splice results in having only a single thickness of fabric over the lands 4 on the drum 13 with the splice overlying the toothed surface. As a result the strain resisting layer formed by the cords 16 will be uniformly spaced from the bases of the teeth on the belt, whereas in a lap splice as shown in FIG. 6, the splice makes a double thickness over the lands which causes radial deflection of the fabric layer 6 at this point. This may cause a small amount of thump as the belt travels over the pulleys since the deflection of the fabric at the splice causes deflection of the strain resisting cords 16 when the latter is wrapped about the composite sheet on the drum. As a result there may be excessive wear at this part of the belt as well as an unevenness in the drive.

The toothed section on the drum is then wound from one end thereof to the other with inextensible cords or wire 16 in a manner well understood in the art of belt making to thus form the tension or strain resisting layer of the belt. The cord is wound with an even tension in either a close spiral or jump cord lay as in Patent 2,272,883 and this layer is then covered with a layer of neoprene 17 as shown in FIG. 8 to hold the cords in place and to provide sufficient rubber to fill the interstices between the cords during the molding operation and to unite the cords and toothed section. In some instances it may be desirable to provide an outer cover 18 for the belt. Such a cover is generally made of cross-woven fabric laid on the bias so as to have permissible stretch when the belt is traveling around a pulley.

The mandrel 13 is then placed in a mold as shown in FIG. 10. This is a "can" type mold such as shown in the Leavenworth Patent 2,253,792. Essentially such a mold comprises an outer shell 19 closed at the sides and at the bottom and has a rubber diaphragm 20 forming the inner wall of a chamber 21, the other wall being formed by the shell 19. Suitable conduits are connected to the interior of the "can" for introducing a curing medium such as steam and suitable ports 22 and 23 are also provided for introducing a fluid under pressure into the chamber 21 and for exhausting that fluid from the chamber. The rubber diaphragm 20 impinges upon the outer surface of the belt on the mandrel 13 and causes a compacting of the material during the vulcanization of the belt. This is well understood in the art of molding V-belts as illustrated in the aforesaid Leavenworth patent.

Alternatively, the belt on mandrel 13 may be wrapped with a spiral layer of fabric as is also common practice in the formation of V-belts and the like.

It is sometimes desirable to make the depth of the grooves 3 in the matrix 1 a few thousandths of an inch deeper than the grooves in the mandrel 13, whereby the grooves 3 have a larger cross-section than the grooves in the mandrel 13. Thus, when the pressure is exerted on the belt during cure or during winding of the cord 16, some of the excess rubber will be forced radially into the interstices between the cords for a better covering of the cords and for a better bond with the cords and the neoprene layer 17.

After vulcanization, the annular band is stripped from the mandrel 13 and placed on a mandrel 24, FIG. 9, which is covered with a uniform layer of rubber 25. Belts of suitable widths may then be cut from the band by a knife 26 as is common practice in the art. Thus, belts of different widths may be cut from the same annular band.

FIG. 14 shows a belt formed by this method and it will be noted that in this view the tension cords 16 lie next to the fabric layer 6 and close to the dedendum line of the teeth. The neoprene is now an integrated mass surrounding the cords 16 and these cords maintain the desired tooth spacing.

The nature of the cords 16 may vary according to the load requirements for the belt. If the belt is to transmit a very heavy load, then it is preferable to use wire cords rather than fabric cords as is common in belt practice, but if fabric cords are used the cords should be such that substantially all of the stretch is removed from the cords before the cords are wrapped on the drum as in FIG. 7. This does not mean that the cords cannot have some small amount of permissible stretch but this requires certain design characteristics of the pulley teeth and belt teeth to assure proper meshing under the load requirements.

In FIG. 11 there is illustrated an alternative method of forming the toothed section from the laminated sheet 5. Instead of first using a flat matrix as shown in FIG. 1 and then a mandrel 13, a cylindrical matrix or mandrel 27 having the surface provided with grooves formed between ridges 28, may be used. The laminated sheet is then wrapped about the surface of the matrix 27 with the ends of the fabric layer overlapping to form a splice. This may require using some cement to hold the ends together until the pressure is applied to form the toothed section. A hollow drum 29 mounted for axial movement relative to the cylinder 27 has an expansible bladder 30 which, when inflated, contracts at its inner diameter and forces the material of the composite sheet into the grooves substantially as is done in FIG. 4 using the Teflon sheet 8 and platen press. The bladder 30 is provided with suitable inlet and outlet openings 31 and 32 for the pressure fluid. This action corresponds with the action shown in FIG. 10 except that no vulcanization takes place. The step of warming the composite sheet should first be accomplished before the full pressure of the diaphragm is exerted against the composite sheet, the same as in the first method described. The drum 29 may be mounted for axial movement of the cylinder 27 in any suitable manner, such as by providing it with legs 33 having grooved wheels 34 traveling on rails 35. Alternatively, the drum could be mounted on a shaft co-axial with the shaft 36 that supports the drum 29.

After forming the toothed section, the drum 29 is removed, the cord 16 is wrapped around the toothed section on the drum as in FIG. 7 and the other layers 17 and 18 applied as in FIG. 8 followed by vulcanization as in FIG. 10.

Numerous advantages result from first making the toothed section of the belt on a flat matrix as compared to forming the toothed section on the cylindrical mandrel. In the first place, it is possible to get a more positive pressure to insure the complete formation of the teeth which is not so easily accomplished by the diaphragm used with a cylindrical mandrel. In addition, in using the flat matrix the toothed section formed thereon is readily stripped from the matrix and when placed on a cylindrical mandrel having lesser cross-section for the grooves, the teeth may be re-shaped and the excess rubber forced between the cords as explained heretofore.

Another advantage of using the flat matrix is that the same matrix may be used for forming the toothed sections for belts of different lengths. Assuming that the matrix is 24" in a direction transversely to the grooves therein and 30" in the direction of the grooves, it is only necessary to provide a stock of fabric and rubber sheets of approximately this same size for different belt lengths. These are readily taken from a stock pile adjacent the bladder press, placed in superposed relation on the matrix to form the laminated sheet and then the pressure is applied to form a toothed section. If a belt 24" in length is to be made, the full sheet may be employed on the mandrel 13. However, if 12" belts are to be formed, then the sheet may be cut in two to make the toothed sections for two belts, or it may be otherwise divided to make a belt of any desired length less than 24". In addition, if it is desired to make belts longer than 24", the 24" sections may be spliced together as at 36 in FIG. 17 to give any desired length.

The fabric sheets are usually impregnated with rubber which causes the sheets to be relatively stiff, making it difficult to wrap them about the surface of a cylindrical mandrel in intimate contact therewith, and also it may be necessary to use a cement for adhering the ends together before applying pressure to the laminated sheets. When the toothed section is made on the flat matrix, gravity holds the sheets in place and the toothed sections may be produced at a very rapid rate, since there is no vulcanization involved. After the toothed section is formed, it is obvious that the teeth are connected only by the fabric between the teeth which may have only an incidental amount of rubber and this provides a hinging action between teeth which makes it easy to wrap the toothed section around the cylindrical matrix. Usually this toothed section has been heated and is somewhat more tacky because of this heat, thus making it easier to splice the ends without the use of cement.

In fact, the operation of forming the toothed section is so simple that one flat matrix used with a single platen press can turn out toothed sections fast enough to service a number of cylindrical mandrels even if the latter are of different diameters. As an example, in one size of belt the toothed section is formed in less than 20 seconds, whereas the building time for building the belt on the cylindrical mandrel using that toothed section, is about 10 minutes and the curing time may run another 20 minutes. In other words, the building and curing time total about 30 minutes and the time required for making the toothed section runs only about 20 seconds. There is, however, the additional time required in cleaning and lubricating the matrix, handling the sheets forming the toothed section and in inserting the matrix into the press and stripping the belt from the press, etc. which may run the total time for completing a toothed section as much as 1 minute. Regardless of the actual time involved, it is quite obvious that the total time involved in making the toothed section is only a small fraction of the time required for the building or curing and in actual practice one flat matrix may actually service 20 or more cylindrical mandrels and, of course, these mandrels may be of different sizes although they would all be using the same toothed section as previously explained. It is obvious from this discussion that the two step method results in greater economies and faster operation.

It may be preferable to build the belt complete on a single cylindrical matrix if the belt is of an odd size and is only to be made in small quantities. Either method, however, is faster than methods previously employed in this art for this purpose as will be appreciated by those skilled in the art.

It will be obvious that the principal object of this invention is to first form the toothed section of the belt complete, so that the teeth are accurate and to do so in a very simple and economical manner. Essentially a fabric should be used that has stretch in at least one direction. Stretch in both directions is not undesirable under all circumstances but it is preferable to have the fabric inextensible transversely of the belt.

Any suitable elastomeric material may be used and for convenience any such material shall be considered as coming within the scope of the invention. For convenience the terms "rubber" or "rubbery material," as used in the claims, shall include any of such materials unless more specifically designated.

It must be borne in mind that belts of this character are frequently very small in cross section. In some of these belts the teeth themselves are not more than 1/16" in depth and perhaps 1/8" in width. Some are made much larger in order to take the required load and the width may vary over a wide range. Great care must be exercised in accurately molding the belts and in designing the shape of the teeth in the matrix because after a load is placed on the belt the belt may stretch to some extent and the teeth must fit the gears under such stretched conditions. Therefore, the molded shape of the teeth and the tooth spacing may be somewhat different from the resulting shape and spacing under load.

In some belts a "stockinette" fabric may be found to be satisfactory for the layer 6. This material is well known in the rubber industry and is stretchable in all directions. This fabric, if used, may be laid on the bias if desired. The one-way stretch material is preferable.

It is particularly important to complete the manufacture of the toothed section before the tension layer is applied so that the tension layer, when applied, will occupy its proper position in the finished belt and there will be no significant displacement of the tension layer during vulcanization.

While certain representative embodiments and details have been shown for the purpose of illustrating the invention, it will be apparent to those skilled in the art that various changes and modifications may be made therein without departing from the spirit or scope of the invention.

We claim:

1. The method of making a toothed belt of the endless variety, comprising the steps of superimposing a layer of rubberized fabric and a layer of rubber on a generally flat matrix having teeth-forming grooves therein with the fabric layer adjacent said matrix, warming said layers and then applying pressure to said layers to force same into the grooves until said grooves are completely filled to form a toothed section for the belt, stripping the toothed section from the matrix, applying said toothed section to a generally cylindrically shaped mandrel provided with grooves extending axially thereof with the teeth of said toothed section lying in said grooves of said mandrel, splicing the ends of said toothed section to form an endless band, applying a tension layer about the exposed outer surface of said toothed section and then vulcanizing the rubber under vulcanizing heat and pressure, the cross-sections of the grooves in said matrix being somewhat larger in cross-section than those in the cylindrically-shaped mandrel whereby the teeth formed on said fabric and rubber by said matrix contain a volume of rubber in excess of that required to fill the grooves in said cylindrically-shaped mandrel whereby when the pressure is applied to conform the teeth of said toothed section to the grooves of the cylindrically-shaped mandrel, the excess rubber will flow radially outward into the tension layer.

2. The method of making a toothed belt of the endless variety, comprising the steps of superimposing a layer of rubberized fabric and a layer of rubber on a generally flat matrix having teeth-forming grooves therein with the fabric layer adjacent said matrix, then applying pressure to said layers to force same into the grooves until said grooves are completely filled to form a toothed section for the belt, stripping the toothed section from the matrix, applying said toothed section to a generally cylindrically-shaped mandrel provided with grooves extending axially thereof with the teeth of said toothed section lying in said grooves of said mandrel, splicing the ends of said toothed section to form an endless band, applying a tension layer about the exposed outer surface of said toothed section and then vulcanizing the rubber under vulcanizing heat and pressure, the cross-sections of the grooves in said matrix being somewhat larger in cross-section than those in the cylindrically-shaped mandrel whereby the teeth formed on said fabric and rubber by said first matrix contain a volume of rubber in excess of that required to fill the grooves in said cylindrically-shaped mandrel whereby when pressure is applied to conform the teeth of said toothed section to the grooves of the cylindrically-shaped mandrel, the excess rubber will flow radially outward into the tension layer.

3. The method of making a toothed belt of the endless variety, comprising the steps of superimposing a layer of rubberized fabric and a layer of rubber on a generally flat matrix having teeth-forming grooves therein with the fabric layer adjacent said matrix, applying pressure to said layers to force same into the grooves until said grooves are completely filled to form a toothed section for the belt, stripping the toothed section from the matrix, trimming the toothed section at one end along the outer edge of a complete tooth and, at the other end trimming the toothed section along a line spaced away from the base of the last tooth of the section to be formed and through a fabric included portion thereof applying said toothed section to a generally cylindrically-shaped mandrel provided with grooves extending axially thereof with the teeth of said toothed section lying in said grooves of said mandrel, splicing the ends of said toothed section by laying the fabric extending from the base of the tooth at one end over the face of the tooth at the other end of said toothed section to form an endless band, wrapping a tension layer under tension about the exposed outer surface of said toothed section to press the toothed section against the grooved surface of said mandrel into conformity therewith and then vulcanizing the rubber under heat and pressure, the cross-sections of the grooves in said matrix being somewhat larger in cross-section than those in the cylindrically-shaped mandrel whereby the teeth formed on said fabric and rubber by said matrix contain a volume of rubber in excess of that required to fill the grooves in said cylindrically-shaped mandrel whereby when pressure is applied to conform the teeth of said toothed section to the grooves of the cylindrically-shaped mandrel, the excess rubber will flow radially outward into the tension layer.

4. The method of making a toothed belt comprising the steps of first forming a toothed section therefor by pressing a substantially flat sheet of deformable material, comprising at least in part a vulcanizable but unvulcanized rubber, against the surface of a matrix provided with spaced tooth forming grooves to cause the material to flow into said grooves to form teeth on one side of said material, separating the toothed section from the matrix, applying said toothed section to a generally cylindrical curing mandrel having teeth forming grooves of smaller cross-section than the grooves in said matrix with the teeth of the toothed section arranged in the grooves of said mandrel and then applying a tension layer having interstices therein, to the outer surface of said toothed section under sufficient pressure to re-shape the teeth in said toothed section to the shape of the grooved surface of said mandrel and to cause flow of the excess deformable material into the interstices of said tension layer to form an unvulcanized belt body, and then curing the belt body under heat and pressure while on the curing mandrel.

5. The method of making a toothed belt comprising the steps of first forming a toothed section therefor by pressing a substantially flat sheet of deformable material, comprising at least in part a vulcanizable but unvulcanized rubber, against a substantially flat surface on a matrix provided with spaced tooth forming grooves to cause the material to flow into said grooves to form teeth on one side of said material, separating the toothed section from the matrix, applying said toothed section to a cylindrical curing matrix having teeth-forming grooves of smaller cross-section than the grooves in said first matrix and then applying sufficient pressure to re-shape the teeth in said toothed section to the shape of the grooved surface of said second matrix to form an unvulcanized belt body and curing the belt body under heat and pressure while on the curing mandrel.

6. The method of making a toothed belt comprising the steps of first forming a toothed section therefor by placing between a matrix formed in its surface with spaced tooth-forming grooves and a press member having a plain surface conforming to the matrix surface and coextensive with the effective area thereof, superimposed layers of high stretch fabric and vulcanizable but unvulcanized rubber, with the fabric adjacent the matrix surface with its direction of stretchability extending transverse to the grooves in the matrix and with the rubber adjacent the press member surface, moving the matrix and press member, one toward the other, under sufficient pressure to cause the rubber to flow into and fill all of the matrix grooves simultaneously and by such flow stretch the fabric into the grooves and against the walls thereof as well as to compress at least the fabric layer between the conforming surfaces of the matrix and press member, thus producing a toothed section with a smooth continuous surface on one side and with spaced apart teeth on the other side, separating the matrix and press member to give access to the toothed member, thereafter applying a strain-resisting layer over the smooth surface of the toothed section to form an unvulcanized belt body, and finally subjecting said belt body to vulcanizing heat and pressure to form the final belt.

7. The method of making a toothed belt comprising the steps of preparing a substantially flat laminated sheet composed of a bottom layer of high stretch rubberized fabric and a top layer of rubber, placing said laminated sheet upon the surface of a matrix provided with spaced tooth-forming grooves with the fabric layer in contact with the matrix surface and arranged so that its stretchability extends transverse to the grooves in said matrix, applying a substantially uniform pressure to the top layer of the sheet to cause the rubber material to flow into and fill all of the matrix grooves simultaneously and by such flow stretch the fabric into and against the walls of said grooves as well as to press the sheet against the matrix surface, thus providing a toothed section with a smooth continuous surface on one side and with spaced apart teeth on the other side, stripping the toothed section from the matrix and joining its opposite ends to form an endless band, mounting the band upon a rigid annular grooved support with the teeth of said toothed section in said latter grooves, applying to the toothed section while mounted on said rigid support a strain-resisting layer on the side of said section opposite that on which the teeth are formed to form an unvulcanized belt body, and then subjecting the belt body to vulcanizing heat and pressure to form the final belt.

8. The method of making a toothed belt of the endless variety comprising the steps of superimposing a layer of rubber upon a layer of rubberized fabric having high stretch in at least one direction and placing the laminated sheet on a generally flat matrix having tooth-forming grooves formed in its surface with the fabric layer adjacent said matrix and with its direction of stretchability transverse to said grooves, warming the two layers of rubber and rubberized fabric and then applying pressure thereto to force the material into all of the matrix grooves simultaneously until said grooves are completely filled so as thus to form a toothed section for the belt, stripping the toothed section from the matrix and applying it to a generally cylindrical shaped curing mandrel formed with axially extending grooves which receive the teeth formed on the toothed section and which have the configuration desired for the teeth in the completed belt, thereafter applying a strain-resisting layer to the exposed outer surface of the toothed section to form an unvulcanized belt body, and then arranging the curing mandrel with the belt body thereon in a vulcanizing chamber and subjecting the belt assembly to heat and pressure in forming the final belt.

9. The method of making a toothed belt comprising the steps of first forming a toothed section thereof by placing on a matrix formed with tooth-forming grooves, superimposed layers of fabric having high stretch in at least one direction and vulcanizable but unvulcanized rubber, with the fabric adjacent the matrix surface having its direction of stretchability extending transverse to the grooves in the matrix, applying a sufficient uniform pressure by a press member to all portions of the superimposed layers in a direction toward said matrix to cause the rubber to flow into and fill all of the matrix grooves simultaneously and by such flow stretch the fabric into conformity with the grooves and against the walls thereof, removing the press member to expose the outer surface of the toothed section, thereafter applying a strain-resistant layer over the toothed section to form an unvulcanized belt body, and finally subjecting said belt body to vulcanizing heat and pressure to form the final belt.

10. The method of making a toothed belt comprising the steps of first forming a toothed section thereof by placing on a substantially flat matrix having tooth-forming grooves, superimposed layers of vulcanizable but unvulcanized rubber and fabric having high stretch in one direction and substantially inextensible in a direction substantially at right angles thereto with the fabric against the matrix, and with the high stretch of the fabric extending transversely to the grooves in the matrix, applying a sufficient pressure to the layers to cause the rubber to flow into the grooves and force the fabric into conforming relation to surfaces of the grooves, stripping the toothed section from the matrix by lifting it at the side adjacent the terminal ends of the matrix grooves and in a direction upwardly and toward the opposite side of the matrix so that any pull on the section is in the direction of the substantial inextensibility of the fabric, applying the toothed section to the grooved surface of a generally cylindrical mandrel with the teeth thereof lying in the grooves of said mandrel, wrapping a tension layer about said toothed section to conform it to the grooved surface of said mandrel to form an unvulcanized belt body and finally vulcanizing the belt body under heat and pressure.

References Cited by the Examiner

UNITED STATES PATENTS

| 1,510,449 | 9/1924 | Brucker | 156—138 |
| 1,928,869 | 10/1933 | Roderwald | 156—192 XR |
| 2,268,865 | 1/1942 | Freedlander | 156—142 XR |
| 2,505,354 | 4/1950 | Gartrell et al. | 156—229 XR |

EARL M. BERGERT, *Primary Examiner.*

P. DIER, *Assistant Examiner.*